United States Patent
Hees et al.

(10) Patent No.: US 8,163,070 B2
(45) Date of Patent: Apr. 24, 2012

(54) METHOD AND SYSTEM FOR EXTRACTING CARBON DIOXIDE BY ANTI-SUBLIMATION AT RAISED PRESSURE

(76) Inventors: Wolfgang Georg Hees, Malmo (SE); Charles Malcom Monroe, Gloucestershire (GB)

( * ) Notice: Subject to any disclaimer, the term of this patent is extended or adjusted under 35 U.S.C. 154(b) by 345 days.

(21) Appl. No.: 12/503,342

(22) Filed: Jul. 15, 2009

(65) Prior Publication Data

US 2010/0024471 A1    Feb. 4, 2010

Related U.S. Application Data

(60) Provisional application No. 61/085,611, filed on Aug. 1, 2008, provisional application No. 61/065,624, filed on Aug. 1, 2008.

(51) Int. Cl.
*B01D 53/00* (2006.01)
(52) U.S. Cl. ................................. 95/290; 62/55.5
(58) Field of Classification Search ................. 62/55.5; 95/290
See application file for complete search history.

(56) References Cited

U.S. PATENT DOCUMENTS

| | | |
|---|---|---|
| 1,992,486 A | 2/1935 | Hunt |
| 2,738,658 A | 3/1956 | Bronson |
| 2,894,838 A | 7/1959 | Gregory |
| 3,324,668 A * | 6/1967 | Lohrenz et al. ............... 62/637 |
| 3,724,225 A | 4/1973 | Mancini et al. |
| 3,724,226 A | 4/1973 | Pachaly |
| 4,152,129 A | 5/1979 | Trentham et al. |
| 4,185,978 A | 1/1980 | McGalliard et al. |
| 4,246,015 A | 1/1981 | Styring, Jr. |
| 4,271,676 A | 6/1981 | Hvizdos |
| 4,318,723 A | 3/1982 | Holmes et al. |
| 4,370,156 A | 1/1983 | Goddin, Jr. et al. |
| 4,441,900 A | 4/1984 | Swallow |

(Continued)

FOREIGN PATENT DOCUMENTS

DE    19739473 A1    3/1999

(Continued)

OTHER PUBLICATIONS

Abstract of JP57175716(A)—"Preparation of Liquefied Carbon Dioxide", Published Oct. 28, 1982, Inventor: Suzuki Kazunari.

(Continued)

*Primary Examiner* — Robert A Hopkins
(74) *Attorney, Agent, or Firm* — Rita D. Vacca

(57) ABSTRACT

A method for removal of CO2 from a gas stream by anti-sublimation, comprising the steps of: a) introducing a gas stream containing CO2 into a frosting vessel; b) reducing the temperature of at least a portion of the gas stream in said frosting vessel to a temperature at which solid CO2 is deposited by anti-sublimation; c) discharging the gas stream depleted of CO2 from the frosting vessel; and d) recovering the deposited solid CO2; wherein the pressure of the gas stream in step b) is higher than atmospheric pressure. An anti-sublimation system for removal of CO2 from a gas stream, comprising: a frosting vessel configured to receive the gas stream, said frosting vessel comprising a low temperature refrigeration device configured for reducing the temperature of at least a portion of a gas stream in said frosting vessel to a temperature at which solid CO2 is deposited by anti-sublimation; and a compressor configured to increase the gas pressure of the gas stream which is fed to the frosting vessel.

22 Claims, 2 Drawing Sheets

U.S. PATENT DOCUMENTS

| | | | |
|---|---|---|---|
| 4,444,576 A | 4/1984 | Ryan et al. |
| 4,459,142 A | 7/1984 | Goddin, Jr. |
| 4,511,382 A | 4/1985 | Valencia et al. |
| 4,533,372 A | 8/1985 | Valencia et al. |
| 4,547,209 A | 10/1985 | Netzer et al. |
| 4,571,175 A | 2/1986 | Bogle et al. |
| 4,681,612 A | 7/1987 | O'Brien et al. |
| 4,717,408 A | 1/1988 | Hopewell |
| 4,891,939 A | 1/1990 | Brighenti |
| 4,923,493 A | 5/1990 | Valencia et al. |
| H825 H | 10/1990 | Green et al. |
| 5,062,270 A | 11/1991 | Haut et al. |
| 5,133,190 A | 7/1992 | Abdelmalek |
| 5,198,311 A | 3/1993 | Nakazawa et al. |
| 5,467,722 A | 11/1995 | Meratla |
| 5,642,630 A | 7/1997 | Abdelmalek et al. |
| 5,724,805 A | 3/1998 | Golomb et al. |
| 5,819,555 A | 10/1998 | Engdahl |
| 5,925,326 A | 7/1999 | Kapoor et al. |
| 6,035,662 A | 3/2000 | Howard et al. |
| 6,082,133 A | 7/2000 | Barclay et al. |
| 6,823,692 B1 | 11/2004 | Patel et al. |
| 7,073,348 B2 | 7/2006 | Clodic et al. |
| 2002/0189443 A1 | 12/2002 | McGuire |
| 2004/0112066 A1 | 6/2004 | Leitch et al. |
| 2004/0118281 A1 | 6/2004 | Leitch et al. |
| 2004/0148961 A1 | 8/2004 | Clodic et al. |
| 2005/0072186 A1 | 4/2005 | Amin et al. |
| 2006/0277942 A1 | 12/2006 | Clodic et al. |
| 2007/0221541 A1 | 9/2007 | McClanahan et al. |
| 2008/0031801 A1 | 2/2008 | Lackner et al. |
| 2008/0141672 A1 | 6/2008 | Shah et al. |
| 2008/0196587 A1 | 8/2008 | Ha |
| 2008/0245101 A1 | 10/2008 | Dubettier-Grenier et al. |
| 2008/0276800 A1 | 11/2008 | Lourenco et al. |
| 2008/0302133 A1 | 12/2008 | Saysset et al. |
| 2009/0035207 A1 | 2/2009 | Klein |
| 2009/0117024 A1 | 5/2009 | Weedon et al. |

FOREIGN PATENT DOCUMENTS

| | | |
|---|---|---|
| EP | 503910 A1 | 9/1962 |
| EP | 964215 A2 | 12/1999 |
| EP | 792837 B1 | 5/2001 |
| EP | 2023066 A1 | 2/2009 |
| GB | 2282082 | 3/1995 |
| JP | 9014831 A | 1/1997 |
| JP | 2003336965 A | 11/2003 |
| WO | WO 2005/105669 | 11/2005 |
| WO | WO 2006054008 A1 | 5/2006 |
| WO | WO 2006112724 A2 | 10/2006 |
| WO | WO 2007077139 A2 | 7/2007 |
| WO | WO 2008044056 A2 | 4/2008 |
| WO | WO 2009047341 A1 | 4/2009 |
| WO | WO 2009013455 A2 | 6/2009 |
| WO | WO 2009070785 A2 | 6/2009 |

OTHER PUBLICATIONS

PCT International Search Report and the Written Opinion of the International Searching Authority dated Nov. 11, 2009—(PCT/EP2009/059568).

* cited by examiner

METHOD AND SYSTEM FOR EXTRACTING CARBON DIOXIDE BY ANTI-SUBLIMATION AT RAISED PRESSURE

CROSS-REFERENCE TO RELATED APPLICATIONS

This application claims the benefit of U.S. Provisional Patent Application Ser. No. 61/085,611 filed Aug. 1, 2008 and U.S. Provisional Patent Application 61/065,624 filed Aug. 1, 2008, which are hereby incorporated by reference in their entirety.

FIELD OF THE INVENTION

The present invention relates to a method for removal of CO2 from a gas stream by anti-sublimation and to an anti-sublimation system for removal of CO2 from a gas stream, said anti-sublimation system comprising at least one frosting vessel.

BACKGROUND ART

Carbon dioxide (CO2) capture in known anti-sublimation systems is done by frosting CO2 ice on cold surfaces inside one or more frosting vessels and subsequently defrosting the CO2 by warming up these same surfaces.

U.S. Pat. No. 7,073,348 pertains to a method and a system for extracting carbon dioxide from fumes derived from the combustion of hydrocarbons in an apparatus designed in particular for the production of mechanical energy. The method comprises the step of cooling said fumes at a pressure more or less equal to atmospheric pressure at a temperature such that the carbon dioxide passes directly from the vapour state to the solid state via an anti-sublimation process. During the anti-sublimation phase, CO2 frost is formed in an anti-sublimation evaporator. The procedure of preparing the anti-sublimation evaporator for a next cycle of anti-sublimation of CO2 contained in the fumes is summarized as follows. The solid CO2 melts, i.e. passes from the solid phase to the liquid phase at a pressure of 5.2 bar. Once the CO2 is entirely in the liquid phase, it is transferred by a pump to a heat-insulated reservoir.

US 2006/0277942 provides a disclosure which is largely similar to that of U.S. Pat. No. 7,073,348, however relating to extraction of sulfur dioxide as well as carbon dioxide.

SUMMARY OF THE INVENTION

An object of the present invention is to increase the CO2 capture efficiency of an anti-sublimation system for CO2 removal.

Another object of the present invention is to reduce the overall energy consumption of an anti-sublimation system for capturing CO2 from a gas stream.

As has become common in this technical field, the term "anti-sublimation" herein refers to a direct gas/solid phase change that occurs when the temperature of the gas in question is below that of its triple point. The term "sublimation" herein refers, as is conventional, to a direct solid/gas phase change.

The above-mentioned objects as well as further objects, which will become apparent to a skilled person after studying the description below, are achieved, in a first aspect, by a method for removal of CO2 from a gas stream by anti-sublimation, comprising the steps of:

a) introducing a gas stream containing CO2 into a frosting vessel;

b) reducing the temperature of at least a portion of the gas stream in said frosting vessel to a temperature at which solid CO2 is deposited by anti-sublimation;

c) discharging the gas stream depleted of CO2 from the frosting vessel; and d) recovering the deposited solid CO2;

wherein the pressure of the gas stream in step b) is higher than atmospheric pressure.

In prior art methods and systems, such as the system described in U.S. Pat. No. 7,073,348, for anti-sublimation of CO2 in a gas stream, the anti-sublimation or "frosting", of CO2 is performed under a pressure more or less equal to atmospheric pressure.

The present invention is based on the insight that the temperature at which frosting may be performed in the frosting vessel, and thus the temperature required in the cold refrigerant of the frosting vessel, is an important factor in controlling the overall energy consumption of the anti-sublimation system. Even a slight increase in the temperature of the cold refrigerant may result in a significant reduction in the overall energy consumption of the anti-sublimation system.

According to the present invention, the frosting step is performed at increased pressure relative to the atmospheric pressure. This allows the temperature of the cold refrigerant to be increased, while still retaining the CO2 capture efficiency of the frosting vessel. As an example, in an embodiment of the CO2 removal system as shown in FIG. 2, the temperature required for removing 90% of the CO2 in the gas stream may be increased from −121° C. when the frosting is performed at atmospheric pressure (i.e. about 1.0 bar) to −115° C. when the frosting is performed at an increased pressure of 2.0 bar. The cooling power is largely unchanged. However, the input power required to produce the same refrigeration at the warmer temperature may be reduced by about 6% compared to the power consumption with the process operating at atmospheric pressure. This reduction in input power corresponds to a significant reduction of the operating costs for the CO2 removal process.

The pressure of the gas stream in step b) may preferably be a pressure which is significantly higher than the atmospheric pressure (i.e. about 1.0 bar), preferably to a pressure above 1.2 bar, more preferably above 1.5 bar or 2.0 bar. The increased pressure may for example be in the range of 1.2 to 30.0 bar, such as in the range of 1.5 to 30.0 bar or 2.0 to 30.0 bar. For practical reasons, the pressure may be kept below 10.0 bar, since this may allow existing systems configured for operation at atmospheric pressure to be used with little or no modification besides the insertion of a compressor, e.g. in a range of from 1.2 to 10.0 bar, such as in the range of 1.5 to 10.0 bar or 2.0 to 10.0 bar.

In an embodiment, the pressure of the gas stream in step b) is higher than 1.5 bar, preferably higher than 2.0 bar. In an embodiment, the pressure of the gas stream in step b) is lower than 10.0 bar.

In an embodiment, the pressure of the gas stream is increased by a compressor before it is introduced into the frosting vessel.

In an embodiment, the pressure of the gas stream is reduced after step b) has been performed. The pressure reduction may preferably be converted into mechanical or electrical energy. The energy conversion may for example be performed by a turbine expander or other device capable of converting gas pressure to mechanical and/or electrical energy.

In an embodiment, wherein the pressure of the gas stream is increased by a compressor and the pressure of the gas stream is converted into mechanical or electrical energy, the produced mechanical or electric energy is at least partially recycled in the compressor.

In an embodiment, the temperature of the gas stream is reduced in one or more pre-cooling steps before it is introduced into the frosting vessel.

Cooling the gas stream at the very low temperatures, such as for example a temperature of −115° C., used in the frosting vessel is very energy consuming. Therefore it is preferred to pre-cool the gas stream at higher temperatures before it is introduced into the frosting vessel. Pre-cooling may be performed in one or more pre-cooling steps, e.g. including water cooling to reduce the temperature of the gas stream to a range of about 0 to 10° C., and one or more conventional refrigeration steps to reduce the temperature of the gas stream to a range of about −20 to −60° C. To further reduce the temperature of the gas stream the cold gas stream which is discharged from the frosting vessel may be used in a heat exchanger to reduce the temperature of the gas stream which is to be introduced into the frosting vessel. In the heat exchanger, the temperature of the gas stream may preferably be further reduced to a temperature in the range of about −80 to −100° C.

In an embodiment, the temperature of the gas stream is in the range of −80 to −100° C. when it is introduced into the frosting vessel.

In a second aspect of the invention, there is provided an anti-sublimation system for removal of $CO_2$ from a gas stream, comprising:

a frosting vessel configured to receive the gas stream, said frosting vessel comprising a low temperature refrigeration device configured for reducing the temperature of at least a portion of a gas stream in said frosting vessel to a temperature at which solid $CO_2$ is deposited by anti-sublimation; and a compressor configured to increase the gas pressure of the gas stream which is fed to the frosting vessel.

The low temperature refrigeration system may preferably be capable of providing a temperature at which anti-sublimation of $CO_2$ may occur, such as a temperature of −110° C. or lower or −115° C. or lower or −120° C. or lower, at a surface in the frosting vessel arranged to contact the gas stream. The low temperature refrigeration system may preferably be configured to operate as an independent unit with a suitable low temperature refrigerant. Examples of low temperature refrigeration systems that may be suitable for use with the anti-sublimation system include, but are not limited to gas cycle refrigeration systems, cascade refrigeration systems and integrated cascade refrigeration systems. In an embodiment the low temperature refrigeration device comprises a gas cycle refrigeration system, a cascade refrigeration system or an integrated cascade refrigeration system. An embodiment combining a low temperature refrigeration device selected from a gas cycle refrigeration system, a cascade refrigeration system or an integrated cascade refrigeration system with increased pressure of the gas stream in the frosting vessel is advantageous since the power consumption of such refrigeration devices is highly dependent on the temperature which is required. An embodiment in which a low temperature refrigeration device selected from a gas cycle refrigeration system, a cascade refrigeration system or an integrated cascade refrigeration system is combined with increased pressure of the gas stream in the frosting vessel may therefore provide a significant reduction in the overall operational costs of the anti-sublimation system.

The compressor may preferably be configured to be capable of increasing the pressure of the gas stream above atmospheric pressure (i.e. about 1.0 bar), preferably above 1.2 bar, more preferably above 1.5 bar or 2.0 bar. The compressor may for example be capable of increasing the pressure of the gas stream to be in the range of 1.2 to 30.0 bar, such as in the range of 1.5 to 30.0 bar or 2.0 to 30.0 bar. For practical reasons, the pressure may be kept below 10.0 bar, e.g. in a range of from 1.2 to 10.0 bar, such as in the range of 1.5 to 10.0 bar or 2.0 to 10.0 bar, since this may allow existing anti-sublimation systems configured for operation at atmospheric pressure to be used with little or no modification besides the introduction of a compressor.

In an embodiment, the anti-sublimation system further comprises an energy converter configured to receive a gas stream which is discharged from the frosting vessel at an increased pressure and convert the pressure into mechanical or electrical energy.

The energy converter may for example comprise a turbine expander or other device capable of converting gas pressure to mechanical and/or electrical energy. In an embodiment comprising an energy converter, the energy converter and the compressor may be in mechanical or electrical connection, such that mechanical or electric energy produced in the energy converter may be at least partially recycled in the compressor.

The anti-sublimation system may comprise two or more frosting vessels in parallel. This allows for one or more frosting vessels to be operated in frosting mode, while one or more other frosting vessels may be operated in defrosting mode. Thus, an anti-sublimation system comprising two or more frosting vessels may be configured to operate more or less continuously in a duty-standby cycle, without interruptions for defrosting. Thus, in an embodiment, the anti-sublimation system further comprises an additional frosting vessel, wherein the two frosting vessels are arranged in parallel, allowing the two frosting vessels to be operated in a duty-standby cycle.

As discussed above, in respect of the first aspect, the temperature of the gas stream may preferably be reduced prior to introduction into the frosting vessel. The anti-sublimation system may therefore comprise one or more pre-cooling devices arranged upstream of the frosting vessel and configured to cool the gas stream to a temperature suitable for introduction into the frosting vessel.

In an embodiment the anti-sublimation system further comprises a first pre-cooling device arranged upstream of the frosting vessel and configured to cool the gas stream to a temperature in the range of 0 to 10° C. The first pre-cooling device may for example comprise a cooling tower.

The anti-sublimation system may further comprise a second pre-cooling device arranged upstream of the frosting vessel and configured to cool the gas stream to a temperature in the range of −20 to −60° C. 18. The second pre-cooling device may for example comprise an industrial refrigeration device.

The cold gas stream depleted of $CO_2$ which is discharged from the frosting vessel may advantageously be used for cooling the gas stream which is to be introduced into the frosting vessel.

In an embodiment, the anti-sublimation system further comprises a heat exchanger configured to receive the cold gas stream which is discharged from the frosting vessel and use it to reduce the temperature of the gas stream which is to be introduced into the frosting vessel.

The position of the compressor upstream of the frosting vessel, and the position of the energy converter downstream of the frosting vessel, may be selected depending for example on whether to maximize the cooling efficiency in the heat exchanger or the mechanical or electrical energy produced by the energy converter.

In an embodiment, the compressor is arranged upstream of the heat exchanger.

In an embodiment, the energy converter is arranged downstream of the heat exchanger.

All features of all embodiments of all aspects of the invention can be used in any possible combination thereof, provided that such combination is not demonstrably unfeasible as determined without undue experimentation by a person having ordinary skill in the art.

In the present disclosure, the term "gas stream" may refer to a stream of any gas mixture comprising CO2. A "gas stream" may, however, typically be a stream of a flue gas resulting from combustion of organic material such as renewable or non-renewable fuels. Should a gas stream to be treated according to the present invention comprise chemical species or particles not suitable in an anti-sublimation system, or not suitable to other features of the present invention, such species or particles may be initially removed by separation technologies known to a skilled man.

The term "defrosting" herein refers to a transformation of ice to another state. In particular it is referred to the transformation of CO2 ice, i.e. solid CO2, to another state.

The terms "upstream" and "downstream", as used in the present disclosure, refer to positions along the gas stream.

Gas pressures in the present disclosure are given in the unit "bar" unless otherwise specified. The unit "bar", as used herein, refers to the absolute pressure, i.e. the pressure in relation to absolute zero pressure, such as in a perfect vacuum.

DETAILED DESCRIPTION

In general, anti-sublimation systems for removal of CO2 from a gas stream comprise a pre-cooling system, and a frosting vessel comprising a low temperature refrigeration system. The pre-cooling system generally comprises a number of cooling stages configured to reduce the temperature of the gas stream prior to the introduction into the frosting vessel. This pre-cooling allows the cooling capacity of the frosting vessel to be minimized. The temperature of the pre-cooled gas stream when it is introduced into the frosting vessel may generally be in the range of −80 to −100° C. In the frosting vessel, the temperature of the gas stream is reduced further, by means of the low temperature refrigeration system, to a temperature at which anti-sublimation of CO2 occurs. During anti-sublimation, CO2 present in the gas stream precipitates and is deposited on the cold surfaces of the frosting vessel. When the layer of solid CO2 has been built up such that the loading capacity of the frosting vessel has been reached, the introduction of gas is stopped, the deposited carbon dioxide is heated by a warm stream of refrigerant from the low temperature refrigeration system, pressurized and liquefied while the fusion energy and sublimation energy are recovered by the refrigeration process. The liquefied carbon dioxide is then evacuated to a storage tank.

The gas stream may also be subjected to other pre-treatment prior to introduction into the frosting vessel, e.g. condensation of water vapour, and/or scrubbing or filtration, to remove particular material and other contaminants contained in the gas stream.

Hereinbelow, embodiments of an anti-sublimation system configured for anti-sublimation of CO2 at raise pressure will be described in detail with reference to the drawings.

Figure 1:
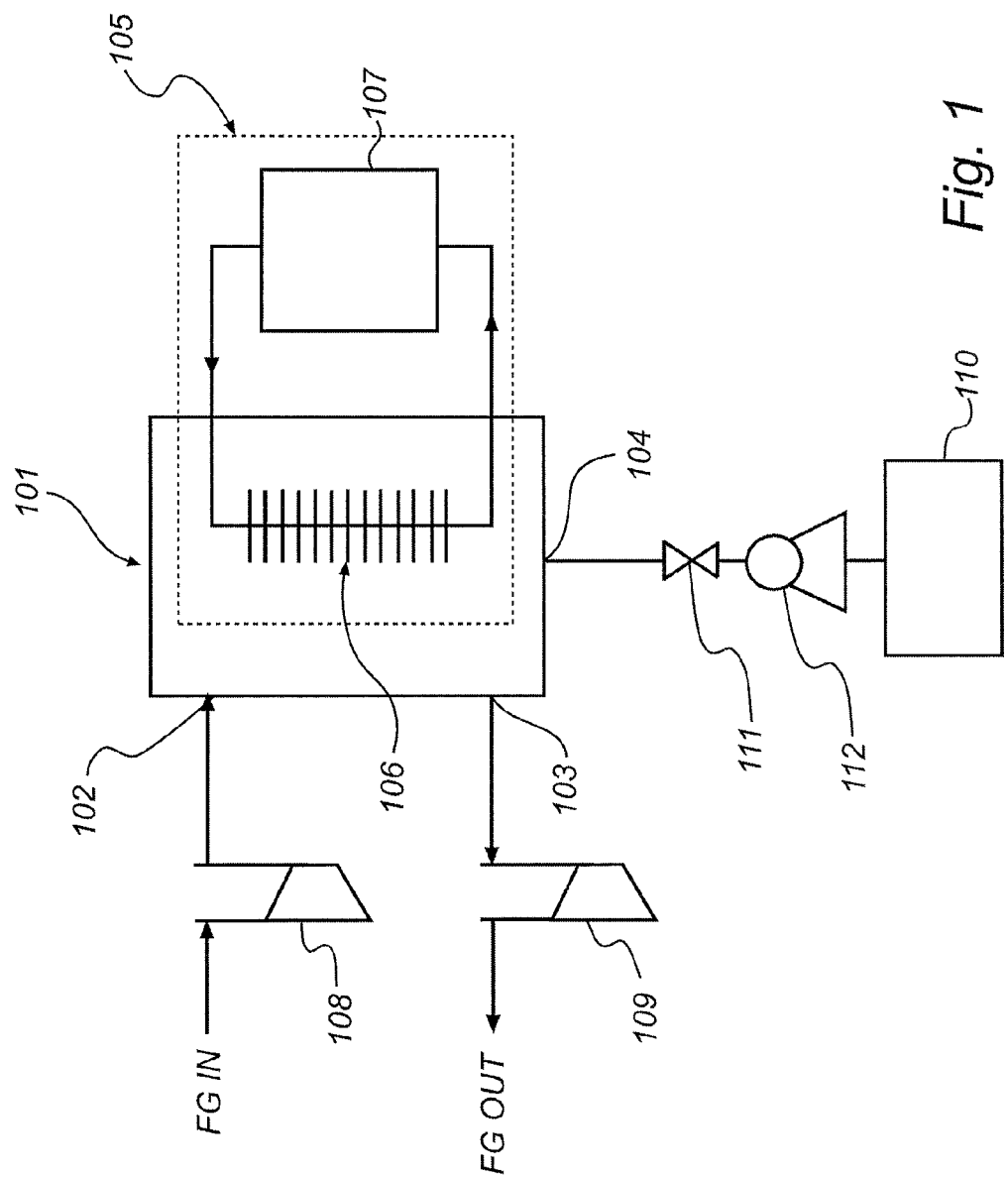
FIG. 1 is a schematic representation of an embodiment of an anti-sublimation system configured to operate at increased pressure.

FIG. 1 represents an embodiment of an anti-sublimation system configured to operate at increased pressure. In the embodiment shown in FIG. 1, the anti-sublimation system comprises a frosting vessel 101 comprising a gas inlet 102 configured to receive a gas stream, a gas outlet 103, a liquid outlet 104. The frosting vessel further comprises a low temperature refrigeration system 105 with a heat exchanger 106 configured to receive a low temperature refrigerant and absorb heat from a gas stream passing through the frosting vessel. The low temperature refrigeration system 105 may preferably be capable of providing a temperature at which anti-sublimation of CO2 may occur, such as a temperature of −110° C. or lower or −115° C. or lower or −120° C. or lower, at a surface of the heat exchanger 106 arranged to contact the gas stream (also referred to herein as "cold surface"). The low temperature refrigeration system 105 may preferably comprise an industrial refrigeration system 107 capable of providing sufficiently low temperatures. Examples of industrial refrigeration systems that may be suitable for use with an anti-sublimation system include, but are not limited to gas cycle refrigeration systems, cascade refrigeration systems and integrated cascade refrigeration systems. The heat exchanger 106 may preferably be configured to facilitate contact with the gas stream passing through the frosting vessel from the gas inlet to the gas outlet and to provide a high surface area of the cold surfaces exposed to contact with the gas stream.

The embodiment of the anti-sublimation system shown in FIG. 1 further comprises a device 108 for increasing the gas pressure (also referred to herein as "compressor") of the gas stream. The compressor 108 may be arranged at any suitable position along the gas stream upstream of the frosting vessel or in direct connection with the gas inlet 102 of the frosting vessel. The compressor 108 may preferably be configured to be capable of increasing the pressure of the gas stream above atmospheric pressure (i.e. about 1.0 bar), preferably above 1.2 bar, more preferably above 1.5 bar or 2.0 bar. The compressor may for example be capable of increasing the pressure of the gas stream to be in the range of 1.2 to 30.0 bar, such as in the range of 1.5 to 30.0 bar or 2.0 to 30.0 bar. For practical reasons, the pressure may be kept below 10.0 bar, e.g. in a range of from 1.2 to 10.0 bar, such as in the range of 1.5 to 10.0 bar or 2.0 to 10.0 bar, since this may allow existing anti-sublimation systems configured for operation at atmospheric pressure to be used with little or no modification besides the insertion of a compressor. The skilled person is capable of selecting a suitable compressor for use in any specific embodiment of the anti-sublimation system.

The embodiment of the anti-sublimation system shown in FIG. 1 further comprises an energy converter 109 configured to receive a gas stream which is discharged from the frosting vessel via gas outlet 103 at increased pressure and low temperature, and convert pressure into mechanical or electrical energy as the gas expands to a lower pressure and increased temperature. The energy converter 109 may for example be a turbine expander, in which the gas stream may expand to a lower pressure and generate mechanical power and/or electrical power, e.g. via an alternator. The mechanical and/or electrical power can be recovered to offset the work of compression in compressor 108. Furthermore, the gas will cool through the expansion process, further reducing the overall refrigeration demand of the system.

The energy converter 109 may be arranged at any suitable position along the gas stream downstream of the frosting vessel 101 or in direct connection with the gas outlet 103 of the frosting vessel. The skilled person is capable of selecting a suitable energy converter for use in any specific embodiment of the anti-sublimation system.

The anti-sublimation system may be arranged to operate in semi-continuous or batch-wise mode. In semi-continuous mode, the gas stream is allowed to flow continuously through the frosting vessel during frosting until the CO2 loading capacity of the frosting vessel has been reached. When the CO2 loading capacity of the frosting vessel has been reached, the introduction of gas through the inlet is stopped and the CO2 deposited in the frosting vessel is recovered. In batch-wise mode, a predetermined amount of gas is introduced into the frosting vessel via the gas inlet, subjected to CO2 frosting and subsequently released via the gas outlet. The cycle may be repeated, e.g., until the CO2 loading capacity of the frosting vessel has been reached, after which the CO2 deposited in the frosting vessel is recovered, e.g. by defrosting the CO2 and collecting it in liquid or compressed gas form.

The low temperature refrigeration system 105 may also be configured to be useful in the defrosting mode of the anti-sublimation system, e.g. by being configured for providing warm low temperature refrigerant, or other suitable heat exchange medium, to the heat exchanger 106 to accelerate melting or sublimation of solid CO2 deposited in the frosting vessel 101. The defrosted CO2 may preferably be discharged via liquid outlet 104 and collected in liquid form in a liquid CO2 collection tank 110, e.g. via a valve 111 and pump 112.

Figure 2:
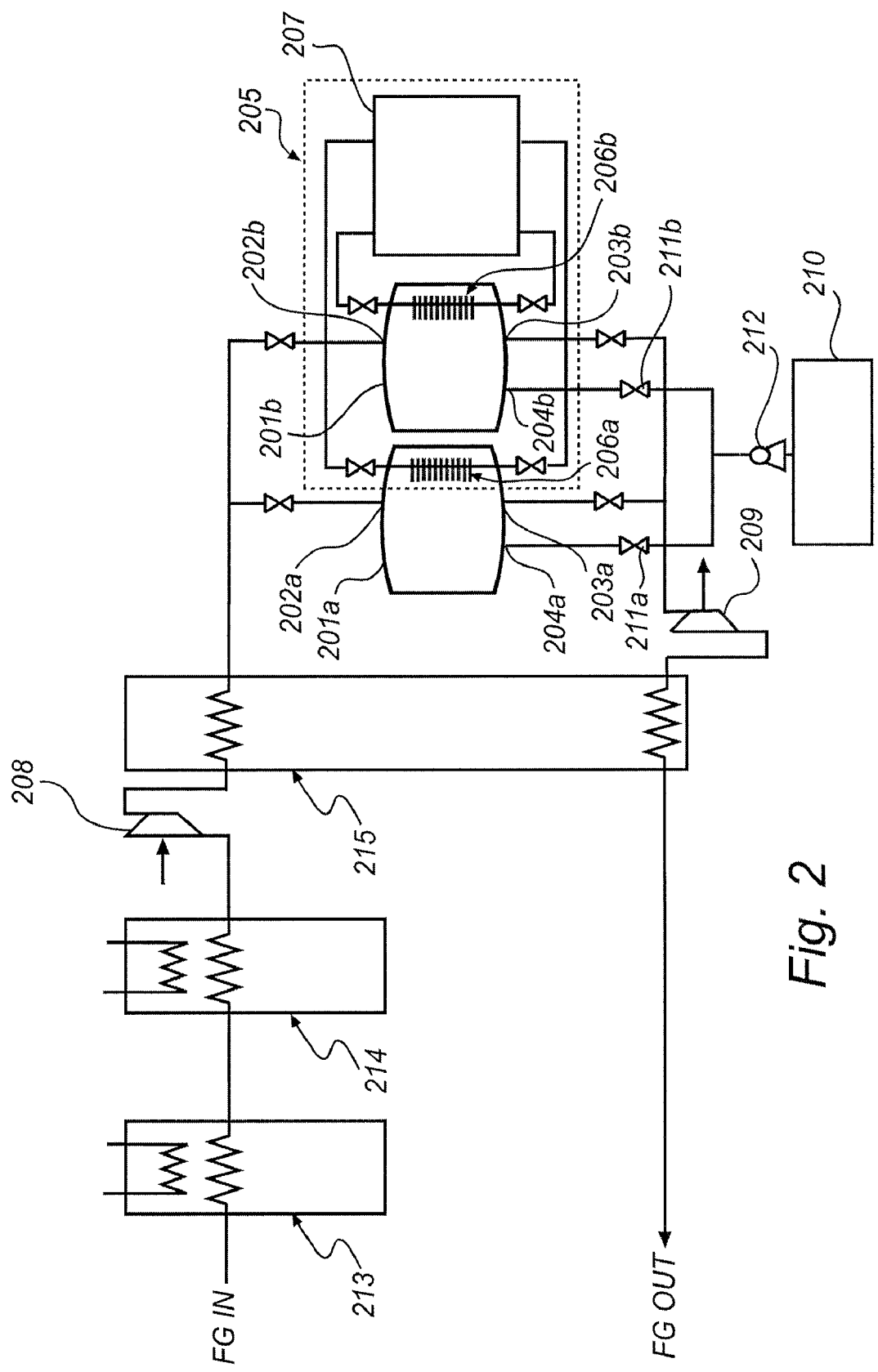
FIG. 2 is a schematic representation of an embodiment of an anti-sublimation system configured to operate at increased pressure.

FIG. 2 represents another embodiment of an anti-sublimation system according to the invention. In the embodiment shown in FIG. 2, the anti-sublimation system comprises a first and a second frosting vessel 201a, 201b, a first and a second cooling stage 213, 214, and a heat exchanger 215. The first and a second cooling stage 213, 214 and the heat exchanger 215 are configured for pre-cooling the gas stream before it is introduced into the first or second frosting vessel 201a, 201b.

The first and second cooling stages 213, 214 comprise heat exchanger devices configured to reduce the temperature of the gas stream. The first cooling stage 213 may for example be configured to cool the gas stream from about 25 to 50° C. to about 0 to 10° C. and the second cooling stage 214 may for example be configured to cool the gas stream from about 0 to 10° C. to about −20 to −60° C. The first cooling stage 213 may for example comprise a cooling tower. The second cooling device 214 may for example comprise a conventional industrial refrigeration unit. The first and second cooling stages 213, 214 may be configured to employ a cold gas stream which is discharged from the first or second frosting vessel for further reducing the temperature of the gas stream which is to be introduced into the frosting vessels. The first and second cooling stages may also be part of a cascade refrigeration system, a gas cycle refrigeration system or other type of refrigeration system.

A heat exchanger 215 is arranged to further reduce the temperature of the gas stream before it is introduced into the first or second frosting vessel 201a, 201b by bringing it into contact for heat exchange with a cold gas stream which is discharged from the first or second frosting vessel. The temperature of the cold gas stream which is discharged from the first or second frosting vessel may generally be lower than −80° C. The heat exchanger may for example be configured to lower the temperature of the gas stream from about −20 to −60° C. to about −80 to −100° C.

The first and second frosting vessels 201a and 201b each comprise a gas inlet 202a, 202b configured to receive the pre-cooled gas stream from the heat exchanger 215, a gas outlet 203a, 203b, a liquid outlet 204a, 204b. The frosting vessel further comprises a low temperature refrigeration system 205 with heat exchangers 206a, 206b configured to receive a low temperature refrigerant and absorb heat from a gas stream passing through the frosting vessels. The low temperature refrigeration system 205 may preferably be capable of providing a temperature at which anti-sublimation of CO2 may occur, such as a temperature of −120° C. or lower, at a surface of the heat exchangers 206a, 206b arranged to contact the gas stream (also referred to herein as "cold surface"). The heat exchangers 206a, 206b may preferably be configured to facilitate contact with the gas stream passing through the frosting vessels 201a, 201b from the gas inlet to the gas outlet and to provide a high surface area of the cold surfaces exposed to contact with the gas stream.

The anti-sublimation system may further comprise a liquid CO2 collection tank 210 arranged to receive liquid CO2 from the frosting vessels during defrosting. The CO2 collection tank is in fluid connection with the liquid outlets 204a, 204b of the frosting vessels 201a and 201b. The fluid connection may preferably comprise a valve 211a or 211b and a pump 212.

When the system is operating in frosting mode, the heat exchangers 206a, 206b are configured to receive a low temperature refrigerant from the low temperature refrigeration system 205 and absorb heat from a gas stream passing through the frosting vessel 201a, 201b. The low temperature refrigeration system 205 may preferably be capable of providing a temperature at which anti-sublimation of CO2 may occur, such as a temperature of −120° C. or lower, at a surface of the heat exchangers 206a, 206b arranged to contact the gas stream (also referred to herein as "cold surface"). The heat exchangers 206a, 206b may preferably be configured to facilitate contact with the gas stream passing through the frosting vessel from the gas inlet 202 to the gas outlet 203 and to provide a high surface area of the cold surfaces exposed to contact with the gas stream.

The low temperature refrigeration system 205 may also be configured to be useful in the defrosting mode of the anti-sublimation system, e.g. by being configured for providing warm low temperature refrigerant, or other suitable heat exchange medium, to the heat exchangers 206a, 206b to accelerate melting or sublimation of solid CO2 deposited in the frosting vessel. The defrosted CO2 may preferably be discharged via liquid outlet 204a, 204b and collected in liquid form in the liquid CO2 collection tank 210.

The anti-sublimation system shown in FIG. 2 may be operated in a duty-standby cycle. This means that a first frosting vessel is used in the frosting mode (duty cycle), while a second frosting vessel is used in the defrosting mode (standby cycle). Once the frosting operation in the first vessel and/or the defrosting operation in the second vessel is completed, the operation may be reversed. This allows the system to be operated substantially continuously even though the operation of each frosting vessel is semi-continuous.

The embodiment of the anti-sublimation system shown in FIG. 2 further comprises a device 208 for increasing the gas pressure (also referred to herein as "compressor") of the gas stream. In this embodiment, the compressor is arranged upstream of the frosting vessel between the second cooling 214 stage and the heat exchanger 215. However, the compressor 208 may alternatively be arranged at any suitable position along the gas stream upstream of the frosting vessel or in direct connection with the gas inlet of the frosting vessel. The compressor 208 may preferably be configured to be capable of increasing the pressure of the gas stream above atmospheric pressure (i.e. about 1.0 bar), preferably above 1.2 bar, more preferably above 1.5 bar or 2.0 bar. The compressor may preferably be configured to be capable of increasing the pressure of the gas stream above atmospheric pressure (i.e. about 1.0 bar), preferably above 1.2 bar, more preferably above 1.5 bar or 2.0 bar. The compressor may for example be capable of increasing the pressure of the gas stream to be in the range of 1.2 to 30.0 bar, such as in the range of 1.5 to 30.0 bar or 2.0 to 30.0 bar. For practical reasons, the pressure may be kept below 10.0 bar, e.g. in a range of from 1.2 to 10.0 bar, such as in the range of 1.5 to 10.0 bar or 2.0 to 10.0 bar, since this may allow existing systems configured for operation at atmospheric pressure to be used with little or no modification besides the insertion of a compressor. The skilled person is capable of selecting a suitable compressor for use in any specific embodiment of the anti-sublimation system.

The embodiment of the anti-sublimation system shown in FIG. 2 further comprises an energy converter 209 configured to receive a gas stream which is discharged from the frosting vessel at an increased pressure and convert the pressure into mechanical or electrical energy. The energy converter 209 may for example be a turbine expander, in which the gas stream may expand to a lower pressure and generate mechanical power. The mechanical power can be recovered to offset the work of compression in compressor 208. Furthermore, the gas will cool through the expansion process, further reducing the overall refrigeration demand of the system. In this embodiment, the energy converter 209 is arranged downstream of the frosting vessels between the frosting vessels 201a, 201b and the heat exchanger 215. However, the energy converter may alternatively be arranged at any suitable position along the gas stream downstream of the frosting vessel or in direct connection with the gas outlet of the frosting vessel. The skilled person is capable of determining the most suitable position of the energy converter depending, e.g., on the desired balance between mechanical power and refrigeration. The skilled person is capable of selecting a suitable energy converter for use in any specific embodiment of the anti-sublimation system.

The process of removing $CO_2$ from a gas stream using an anti-sublimation system as shown in FIG. 1 will now be described. The gas stream from which $CO_2$ is to be removed is, optionally following removal of water, particles and other contaminants, first subjected to a pre-cooling phase, in which the temperature of the gas stream is successively lowered in one or more cooling steps. The temperature of the gas stream may for example be lowered in a first cooling step from a temperature of about 25 to 50° C. or higher to a temperature of about 0 to 10° C., e.g. using a cooling tower with water as the cooling medium and in a second cooling step from a temperature of about 0 to 10° C. to a temperature of about $-20$ to $-60°$ C., using conventional refrigeration methods. The pre-cooling phase may further comprise an additional cooling step, wherein the temperature of the gas stream is lowered further, in a heat exchanger, using the cold gas stream discharged from the frosting vessel in which frosting is being performed. In the heat exchanger, the temperature of the gas stream may for example be lowered from about $-20$ to $-60°$ C. to about $-80$ to $-100°$ C.

The gas stream is further subjected to a compression phase, in which the gas pressure of the gas stream is increased, e.g. by a compressor, to a pressure exceeding atmospheric pressure. Compression may be performed before, during or after the pre-cooling phase, although it may be preferred to perform the after the pre-cooling phase or during the pre-cooling phase directly before the heat exchange with cold gas stream discharged from the frosting vessel. The pressure of the gas stream may preferably be increased to a pressure which is significantly higher than the atmospheric pressure (i.e. about 1.0 bar), preferably to a pressure above 1.2 bar, more preferably above 1.5 bar or 2.0 bar. The increased pressure may for example be in the range of 1.2 to 30.0 bar, such as in the range of 1.5 to 30.0 bar or 2.0 to 30.0 bar. For practical reasons, the pressure may be kept below 10.0 bar, e.g. in a range of from 1.2 to 10.0 bar, such as in the range of 1.5 to 10.0 bar or 2.0 to 10.0 bar.

In the frosting phase, the pre-cooled and compressed gas stream is introduced via the gas inlet into the frosting vessel in which anti-sublimation of $CO_2$ is performed. In the frosting vessel, the gas stream is brought into contact with cold surfaces of a low temperature refrigeration system. The cold surfaces are sufficiently cold to cause anti-sublimation of $CO_2$ gas present in the gas stream to form deposits of solid $CO_2$ ice on the cold surfaces. At least a portion of the cold surfaces may have a surface temperature of $-110°$ C. or lower, preferably $-115°$ C. or lower and more preferably $-120°$ C. or lower. The gas stream depleted of $CO_2$ is then discharged via the gas outlet, still at low temperature and elevated pressure.

The cold discharged gas stream depleted of $CO_2$ may then be subjected to an expansion phase, in which the gas pressure of the gas stream is decreased, e.g. in a turbine expander. In the expansion phase, the temperature of the gas stream increases and the pressure of the gas stream decreases during production of mechanical and/or electrical power. Furthermore, the power generated in the expansion phase, e.g. by a turbine expander, may advantageously be used to offset the power required to compress the gas stream in the compression phase.

The cold gas discharged from the frosting vessel may also advantageously be used, before or after the expansion phase, to cool the incoming gas stream in the pre-cooling phase. The cold gas discharged from the frosting vessel may for example be used to provide refrigeration at successively higher temperatures in the heat exchanger and one or more cooling steps of the pre-cooling phase.

We claim:

1. Method for removal of $CO_2$ from a gas stream by anti-sublimation, comprising the steps of:
    a) introducing a gas stream containing $CO_2$ into a frosting vessel;
    b) reducing the temperature of at least a portion of the gas stream in said frosting vessel to a temperature at which solid $CO_2$ is deposited by anti-sublimation;
    c) discharging the gas stream depleted of $CO_2$ from the frosting vessel;
    d) recovering the deposited solid $CO_2$; and
    e) using an additional frosting vessel for a duty-standby cycle;
  wherein the pressure of the gas stream in step b) is higher than atmospheric pressure.

2. Method according to claim 1, wherein the pressure of the gas stream in step b) is higher than 1.5 bar.

3. Method according to claim 2, wherein the pressure of the gas stream in step b) is higher than 2.0 bar.

4. Method according to claim 1, wherein the pressure of the gas stream in step b) is lower than 10.0 bar.

5. Method according to claim 1, wherein the pressure of the gas stream is increased by a compressor before it is introduced into the frosting vessel.

6. Method according to claim 1, wherein the pressure of the gas stream is reduced after step b) has been performed.

7. Method according to claim 6, wherein the reduction of pressure is converted into mechanical or electrical energy.

8. Method according to claim 7, wherein said mechanical or electric energy is at least partially recycled in a compressor.

9. Method according to claim 1, wherein the temperature of the gas stream is reduced in one or more pre-cooling steps before it is introduced into the frosting vessel.

10. Method according to claim 1, wherein the temperature of the gas stream is in the range of −80 to −100° C. when it is introduced into the frosting vessel.

11. Method according to claim 1, wherein recovering the deposited solid $CO_2$ includes:
liquefying the deposited solid $CO_2$; and
evacuating the liquefied $CO_2$ from the frosting vessel.

12. Anti-sublimation system for removal of $CO_2$ from a gas stream, comprising:
a frosting vessel configured to receive the gas stream, said frosting vessel comprising a low temperature refrigeration device configured for reducing the temperature of at least a portion of a gas stream in said frosting vessel to a temperature at which solid $CO_2$ is deposited by anti-sublimation;
a compressor configured to increase the gas pressure of the gas stream which is fed to the frosting vessel; and
an additional frosting vessel for operation in a duty-standby cycle.

13. Anti-sublimation system according to claim 12, wherein the low temperature refrigeration device comprises a gas cycle refrigeration system, a cascade refrigeration system or an integrated cascade refrigeration system.

14. Anti-sublimation system according to claim 12, further comprising an energy converter configured to receive a gas stream which is discharged from the frosting vessel at an increased pressure and convert the pressure into mechanical or electrical energy.

15. Anti-sublimation system according to claim 12, wherein the two frosting vessels are arranged in parallel.

16. Anti-sublimation system according to claim 12, further comprising a first pre-cooling device arranged upstream of the frosting vessel and configured to cool the gas stream to a temperature in the range of 0 to 10° C.

17. Anti-sublimation system according to claim 16, wherein said first pre-cooling device comprises a cooling tower.

18. Anti-sublimation system according to claim 12, further comprising a second pre-cooling device arranged upstream of the frosting vessel and configured to cool the gas stream to a temperature in the range of −20 to −60° C.

19. Anti-sublimation system according to claim 18, wherein said second pre-cooling device comprises an industrial refrigeration device.

20. Anti-sublimation system according to claim 12, further comprising a heat exchanger configured to receive the cold gas stream which is discharged from the frosting vessel and use it to reduce the temperature of the gas stream which is to be introduced into the frosting vessel.

21. Anti-sublimation system according to claim 20, wherein the compressor is arranged upstream of the heat exchanger.

22. Anti-sublimation system according to claim 20, wherein the energy converter is arranged downstream of the heat exchanger.

* * * * *